United States Patent [19]

Koike et al.

[11] Patent Number: 5,257,036

[45] Date of Patent: Oct. 26, 1993

[54] INK JET RECORDING PROCESS EMPLOYING INK CONTAINING WATER-SOLUBLE DYE

[75] Inventors: Shoji Koike, Yokohama; Yasuko Tomida, Atsugi, both of Japan

[73] Assignee: Canon Kabushiki Kaisha, Tokyo, Japan

[21] Appl. No.: 719,153

[22] Filed: Jun. 21, 1991

Related U.S. Application Data

[63] Continuation of Ser. No. 506,525, Apr. 9, 1990, Pat. No. 5,053,078, which is a continuation of Ser. No. 128,264, Dec. 1, 1987, abandoned.

[30] Foreign Application Priority Data

Dec. 2, 1986 [JP] Japan ................ 61-287064
Dec. 2, 1986 [JP] Japan ................ 61-287065
Dec. 2, 1986 [JP] Japan ................ 61-287066
Dec. 2, 1986 [JP] Japan ................ 61-287067
Dec. 2, 1986 [JP] Japan ................ 61-287068

[51] Int. Cl.$^5$ .................. B41J 2/01; G01D 9/00
[52] U.S. Cl. ........................................ 346/1.1
[58] Field of Search ............ 346/1.1; 106/20, 22, 106/20 R, 20 D

[56] References Cited

U.S. PATENT DOCUMENTS

| | | | |
|---|---|---|---|
| 4,238,234 | 12/1980 | Lang | 106/22 |
| 4,243,994 | 1/1981 | Kobayashi et al. | 346/140 R |
| 4,256,493 | 3/1981 | Yokoyama et al. | 106/22 |
| 4,343,653 | 8/1982 | Beach et al. | 106/22 |
| 4,620,876 | 11/1986 | Fujii et al. | 106/22 |
| 4,853,036 | 8/1989 | Koike et al. | 106/20 |
| 4,855,278 | 8/1989 | Igarashi et al. | 503/208 |

FOREIGN PATENT DOCUMENTS 2388870 11/1978 France.
0041371 3/1984 Japan.
1590159 5/1981 United Kingdom.

OTHER PUBLICATIONS

Patent Abstracts of Japan, vol. 8, No. 145, (C-232) [1582], Jul. 6, 1984; and JP-A-59 53 567.
Patent Abstracts of Japan, vol. 6, No. 85 (C-103) [963], May 22, 1982; and JP-A-57 18 767.
Patent Abstracts of Japan, vol. 5, No. 75 (C-55) [747], May 19, 1981; and JP-A-56 24 472.
IBM Technical Disclosure Bulletin, vol. 23, No. 4, Sep. 1980, New York, USA; W. T. Pimbley: "Leuco dye system for ink jet printing".

Primary Examiner—Benjamin R. Fuller
Assistant Examiner—Alrick Bobb
Attorney, Agent, or Firm—Fitzpatrick, Cella, Harper & Scinto

[57] ABSTRACT

An ink jet recording process employing an ink which comprises a liquid medium containing at least water and an organic solvent and containing therein a water-soluble dye selected from the group consisting of a solubilized vat dye, a solubilized sulfur dye, a leuco salt of a vat dye, and a leuco salt of a sulfur dye. In one embodiment of the invention, the ink can be fixed on a recording medium by oxidation, and is suitable for ink-jet printing.

11 Claims, No Drawings

INK JET RECORDING PROCESS EMPLOYING INK CONTAINING WATER-SOLUBLE DYE

This application is a continuation of allowed application Ser. No. 07/506,525 filed Apr. 9, 1990, now U.S. Pat. No. 5,053,078 issued Oct. 1, 1991, which is a continuation of abandoned application Ser. No. 07/128,264, filed Dec. 1, 1987.

BACKGROUND OF THE INVENTION

1. Field of the Invention

The present invention relates to ink suited for ink-jet recording and an ink-jet recording process employing the ink. More particularly, it relates to ink having a good long-term storage stability and achieving a good water resistance of records, and an ink-jet recording process employing it.

2. Description of the Related Art

In ink-jet recording methods, ink droplets are formed according to various ink ejection methods (for example, known are an electrostatic attraction method, a method in which a mechanical vibration or displacement is applied to ink with use of a piezoelectric device, a method in which ink is heated to utilize the pressure thereby produced, etc.), and a part, or the whole, thereof is adhered on a recording medium such as paper to effect the recording.

As for the ink to be used, chiefly employed is a process of carrying out the recording by use of a recording liquid (also called an ink) mainly comprised of water and a water-soluble organic solvent and in which a dye is dissolved.

In the recording process carried out by use of the ink of this type, the items required to be satisfied may somewhat differ depending on the recording method, but what are most important as the items commonly required to be satisfied are that;

(1) no feathering occurs and recorded images of good quality can be obtained;

(2) ink can be fixed rapidly;

(3) prints have excellent fastness such as water resistance, light-fastness or the like;

(4) nozzles and ink pathway are not clogged with ink;

(5) stable ejection can be achieved for a long period of time;

(6) ink may undergo no change even after its storage for a long period of time; etc.

To satisfy a part of, or the whole of, the above objects, studies have been actively carried out from both viewpoints of apparatus and ink, and considerable effect has been realized depending on what performance is required.

However, since most part of the conventional aqueous ink as mentioned above is held by those in which a direct dye or an acid dye is used as a dye, there may arise a problem in various kind of fastness, particularly the water resistance, when the recording is carried out by an ink-jet recording method, particularly when paper or cloth having a recording face on which fibers are exposed is used as a recording medium.

To cope with this problem, a great number of proposals have been made regarding employment of aqueous inks of a pigment dispersion type (for example, Japanese Patent Laid-open Publication No. 147859/1981). According to these method, the fastness of records can be satisfied to a certain extent, but the problem of clogging of nozzles occurring when such inks are used for ink-jet recording and the problem in the storage stability of ink may become considerably serious as compared with the conventional ink of the dye dispersion type.

SUMMARY OF THE INVENTION

Accordingly, an object of the present invention is to provide an ink for ink-jet recording that can obtain records excellent in the fastness of every kind, particularly the water resistance, when used on not only designated paper specially prepared for use in ink-jet recording but also other recording media having fibers exposed on the surface, in particular, generally used ordinary sized paper typified by copying paper, report paper, bond paper and continuous business forms, and also an ink-jet recording process employing it.

Another object of the present invention is to provide ink that can have good storage stability and may cause no clogging, and an ink-jet recording employing it.

The present invention provides an ink comprising a liquid medium containing at least water and an organic solvent, and containing therein a water-soluble dye oxidizable to be water-insoluble and an antioxidant in combination.

In another embodiment, the ink comprises a liquid medium containing at least water and an organic solvent, and containing therein a water-soluble dye oxidizable to be water-insoluble, a water-soluble anionic dye and an antioxidant in combination.

The present invention also provides an ink-jet recording process comprising carrying out the recording by adhering ink on a recording medium, wherein said ink contains at least a water-soluble dye oxidizable to be water-insoluble, and said recording medium has a recording face on which fibers are exposed.

In another embodiment, the ink-jet recording process comprises applying to a recording medium an aqueous ink containing a water-soluble dye oxidizable to be water-insoluble, followed by fixing by oxidation.

DETAILED DESCRIPTION OF THE PREFERRED EMBODIMENTS

To describe further the present invention in detail, the present invention is chiefly characterized in that no pigment is used as a coloring material for achieving a high fastness and instead an ink comprising a water-soluble dye is used.

More specifically, since such ink is of a solution type, its color material concentration, viscosity, surface tension, etc. can be relatively freely varied, and also since it does not contain any insoluble matters or precipitating components, no clogging may occur in ink-feeding paths and nozzles. Thus, unlike the conventional ink for ink-jet recording, containing a pigment, it has very good stability and suitability for ink-jet recording, bringing about no problems at all from the standpoint of apparatus.

The present invention is secondly characterized in that an antioxidant is further used in combination in the above ink. This makes it possible to prevent insoluble matters or precipitating components from being generated in nozzles caused by deterioration of the dye, so that the reliability as an ink-jet system can be greatly improved.

The present invention is thirdly characterized in that the above ink is fixed by changing a water-soluble group of the water-soluble dye contained in the ink to a water-insoluble group by oxidation after it has been adhered on a recording medium. This makes the dye itself water-insoluble, and there can be obtained records having very good water resistance like the instance in which the pigment type ink is used.

The ink which is water-based and of a dye solution type, used in the present invention and firstly characterizing the present invention, basically has the components as described below.

As the dye characterizing the ink of the present invention, there can be used any dyes so long as they are water-soluble and can structurally turn to water-insoluble ones by oxidation, but particularly preferred from the viewpoint of the performance of ink are solubilized vat dyes, solubilized sulfur dyes, leuco salts of vat dyes, leuco salts of sulfur dyes, oxidation dyes, etc.

Such dyes are commercially available from those developed for use in the dyeing of fibers, which may be used as they are, or, in the case of the dyes of the leuco salt type, for example, a person skilled in the art can readily obtain them by reducing conventionally known vat dyes or sulfur dyes according to a conventional method to make them alkaline.

Examples of the above dyes used in the present invention include the following:

1) Solubilized vat dyes:

Those having been made water-soluble by introducing a water-solubilizing group such as a sulfo group into a molecule of a conventional water-insoluble vat dyes, specifically including, for example;
C.I. Solubilized Vat Yellow 1, 2, 3, 4, 5, 6, 7, 8, 45, 47;
C.I. Solubilized Vat Orange 1, 2, 3, 4, 5, 6, 9, 11;
C.I. Solubilized Vat Red 1, 2, 3, 4, 6, 8, 9, 10, 11, 34, 45;
C.I. Solubilized Vat Violet 1, 2, 3, 4, 5, 6, 7, 8;
C.I. Solubilized Vat Blue 1, 2, 3, 4, 5, 6, 7, 8, 9, 41, 73;
C.I. Solubilized Vat Green 1, 2, 3, 4, 21, 30;
C.I. Solubilized Vat Brown 1, 3, 5, 6, 7, 38;
C.I. Solubilized Vat Black 1, 2, 4, 5, 6, 8, 25, 61; etc.

These solubilized vat dyes can be synthesized by a conventional method, or a person skilled in the art can readily obtain these by subjecting commercially available products to conventionally known purification processes, for example, the purification process employing a reverse osmosis membrane, an ultrafiltration membrane, an ion-exchange resin of every type or a chelate resin, or to the salting-out process, the acid precipitation process, the centrifugal process, the re-precipitation process or the solvent washing process, which can be used alone or in combination.

2) Leuco salts of vat dyes:

Those obtained by allowing a reducing agent to act on a conventional water-insoluble vat dye under an alkaline condition to form a leuco salt thereof.

Examples of the vat dyes serving as mother dyes for forming the leuco salts include;
C.I. Vat Yellow 1, 2, 4, 12, 20, 22, 33, 37, 46, 48, 49;
C.I. Vat Orange 1, 2, 3, 5, 7, 9, 11, 11:1, 13, 15, 26, 29;
C.I. Vat Red 1, 2, 10, 13, 14, 15, 21, 23, 29, 31, 32, 41, 51;
C.I. Vat Violet 1, 1:1, 2, 3, 9, 13, 21;
C.I. Vat Blue 1, 3, 4, 5, 6, 6:1, 12, 14, 16, 18, 19, 20, 22, 26, 29, 30, 42, 43, 56, 64, 65, 66, 72;
C.I. Vat Green 1, 2, 3, 5, 7, 8, 9, 13, 14, 26, 29, 31, 33, 40;
C.I. Vat Brown 1, 3, 4, 5, 9, 17, 25, 33, 45, 50, 55, 57, 68, 72, 84;
C.I. Vat Black 8, 8:1, 9, 14, 19, 20, 25, 27, 31, 32, 34; etc.

The leuco salts of vat dyes can be synthesized according to a conventional method, or a person skilled in the art can readily obtain these according to a conventionally known method in which a commercially available vat dye is reduced with use of a reducing agent such as hydrosulfite and subsequently an alkaline compound such as sodium hydroxide is added.

3) Solubilized sulfur dyes:

Those having been made water-soluble by introducing a water-solubilizing group such as a sulfo group into a molecule of a conventional water-insoluble sulfur dyes, specifically including, for example;
C.I. Solubilized Sulfur Yellow 9, 16, 19, 20;
C.I. Solubilized Sulfur Orange 1;
C.I. Solubilized Sulfur Red 2, 6, 7, 10, 11, 12, 13;
C.I. Solubilized Sulfur Blue 2, 3, 5, 7, 9, 11, 13, 15, 19;
C.I. Solubilized Sulfur Green 1, 2, 3, 6, 9, 14, 19, 22, 25, 27, 31, 36, 37;
C.I. Solubilized Sulfur Brown 1, 8, 10, 12, 15, 16, 21, 46, 51, 52, 63, 88, 89, 90, 91, 93, 94, 96;
C.I. Solubilized Sulfur Black 1, 5, 6, 8, 11; etc.

These solubilized sulfur dyes can be synthesized by a conventional method, or a person skilled in the art can readily obtain these by subjecting commercially available products to conventionally known purification processes, for example, the purification process employing a reverse osmosis membrane, an ultrafiltration membrane, an ion-exchange resin of any type or a chelate resin, or to the salting-out process, the acid precipitation process, the centrifugal process, the reprecipitation process or the solvent washing process, which can be used alone or in combination.

4) Leuco salts of sulfur dyes:

Those obtained by allowing a reducing agent to act on a conventional water-insoluble sulfur dye under an alkaline condition to form a leuco salt thereof.

Examples of the sulfur dyes serving as mother dyes for forming the leuco salts include;
C.I. Sulfur Yellow 9, 16, 19, 20;
C.I. Sulfur Orange 1;
C.I. Sulfur Red 2, 6, 7, 10, 11, 12, 13;
C.I. Sulfur Blue 2, 3, 5, 7, 9, 11, 13, 15, 19;
C.I. Sulfur Green 1, 2, 3, 6, 9, 14, 19, 22, 25, 27, 31, 36, 37;
C.I. Sulfur Brown 1, 1:1, 7, 8, 10, 12, 15, 16, 21, 46, 51, 52, 63, 88, 89, 90, 91, 93, 94, 96;
C.I. Sulfur Black 1, 5, 6, 8, 11; etc.

The leuco salts of sulfur dyes can be synthesized according to a conventional method, or a person skilled in the art can readily obtain these according to a conventionally known method in which a commercially available sulfur dye is reduced with use of a reducing agent such as sodium sulfide and an alkaline salt such as anhydrous sodium carbonate is added.

These dyes may be contained in an amount that may be determined depending on the kind of the liquid medium components and the properties required for the ink, and generally in an amount of 0.1 to 15% by weight, preferably 0.1 to 10% by weight, based on the total amount of the ink.

In another embodiment of the ink of the present invention, the ink contains a water-soluble anionic dye in combination in addition to any of the above dyes. Particularly preferred from the viewpoint of its properties are acid dyes and direct dyes.

The reason why the water-soluble anionic dye is contained in combination in the present invention is that the use of a single dye oxidizable to be water-insoluble may sometimes give a record having an undesirable color density and an undesirable color tone due to the solubility to the liquid medium or the limitation in the molecular structure while the combined use of a water-soluble anionic dye will solve the problem.

However, use of the water-soluble anionic dye in a large amount may impair the high fastness of records, particularly the water resistance, which is one of the aims in the present invention. Accordingly, the dye oxidizable to be water-insoluble and the water soluble anionic dye should be contained in the ratio ranging between 10:1 and 1:10 and contained preferably in an amount of 0.1 to 15% by weight, more preferably 0.1 to 5% by weight, in the total weight of the both.

The antioxidant secondly characterizing the ink of the present invention can suppress the spontaneous oxidation that may be promoted under the condition of light or heat, and, from the viewpoint of the mechanism of the prevention of oxidation, can be roughly grouped into three groups consisting of a free radical chain terminator, a peroxide decomposer and a metal inactivator. Specifically, it may include hydroquinone, methylhydroquinone, erythorbic acid, sodium erythorbate, ascorbic acid, isopropyl citrate, dibutylhydroxytoluene, DL-α-tocopherol, nordihydroguaiaretic acid, butylhydroxyanisole, propyl gallate, isoamyl gallate, sesamol, quercetin, ethyl protocatechuate, β-naphthol, phenyl-β(α)-naphthylamine, tetramethyldiaminophenyl methane, alkylphenol sulfides, tributyl phosphite, triphenyl phosphite, etc., but is by no means limited to these. Among the above substances, particularly preferred are hydroquinone, methylhydroquinone, erythorbic acid (or a sodium salt thereof) and ascorbic acid which are readily soluble in water.

These antioxidants may be used preferably in the range of 0.1 to 10% by weight, more preferably 0.1 to 5% by weight.

The foregoing are the essential components characterizing the ink of the present invention. In the present invention, as the liquid medium in which the above mentioned dyes and antioxidants are dissolved, there can be used any media generally used in the medium for the conventional ink for ink-jet recording, and it may preferably contain an organic solvent in addition to water. The organic solvent may include, for example, alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols having 2 to 6 alkylene groups, such as ethylene glycol, propylene glycol, butylene glycol, triethylene glycol, 1,2,6-hexanetriol, thiodiglycol, hexylene glycol and diethylene glycol; glycerol; lower monoalkyl ethers of polyhydric alcohols, such as ethylene glycol monomethyl(or ethyl) ether, diethylene glycol monomethyl(or ethyl) ether and triethylene glycol monomethyl(or ethyl) ether; lower dialkyl ethers of polyhydric alcohols, such as triethylene glycol dimethyl(or ethyl) ether and tetraethylene glycol dimethyl(or ethyl) ether; sulfolane, N-methyl-2-pyrrolidone, 1,3-dimethyl-2-imidazolidinone, etc.

The solvent as described above is used together with water, but, as said solvent, at least one water-soluble high boiling organic solvent, for example, polyhydric alcohol such as diethylene glycol, propylene glycol and glycerol should preferably be contained.

The essential components of the ink concerning the present invention are as described above, but there can be optionally added other dispersants, surface active agents, viscosity modifiers, surface tension modifiers, brightening agents, pH adjusters, mildew-proofing agents, chelating agents, reducing agents, etc.

For example, there may be included viscosity modifiers such as polyvinyl alcohol, celluloses and water-soluble resins; surface tension modifiers such as cationic, anionic or nonionic surface active agents, diethanolamine and triethanolamine; pH adjusters utilizing a buffer solution; etc.

To prepare the ink used in the ink-jet recording process of the type in which the ink is electrically charged, there is added a specific resistance regulator including inorganic salts such as lithium chloride, ammonium chloride and sodium chloride. In instances in which the ink is used in the ink-jet recording process of the type in which the ink is ejected by the action of a heat energy, the values for thermal properties (for example, specific heat, coefficient of thermal expansion, thermal conductivity) are sometimes adjusted.

In the ink for ink-jet recording of the present invention as described above, what is required together in addition to the fastness is the performance that less feathering may occur and good fixing ability can be achieved especially when used on ordinary paper on which fibers are exposed (particularly preferable is the one having a basis weight of 30 to 200 $g/m^2$, more preferably 45 to 200 $g/m^2$, and having a stockgit sizing degree of not more than 1000 seconds), or cloth. Accordingly, the ink properties of the ink may preferably be controlled such that the surface tension at 25° C. is 35 to 65 dyne/cm and the viscosity is 15 cP or less, preferably 8 cP or less, more preferably 3 cP or less.

The foregoing describes the outline of the ink of the present invention, but the present invention is thirdly characterized in that the above ink is fixed by changing a water-soluble group of the water-soluble dye contained in the ink to a water-insoluble group by oxidation after it has been adhered on a recording medium.

A specific method for the oxidation may preferably include a method in which the recording medium itself is selected by using rosin-sized paper or modified by adding an oxidizing agent to the recording medium. A more preferable method that can be included is to provide a thermal oxidation means using a heating roller or warm air, or a photo-oxidation means utilizing irradiation of ultraviolet to infrared light.

The present invention that can be acquired in the above manner is an ink-jet recording process that can attain both the advantage that the ink may not cause any clogging and has a good long-term storage stability as in the instance in which the conventional water-base ink employing direct dyes or acidic dyes is used, and the advantage that the records have a very good fastness, particularly a high water-resistance, as in the instance in which the pigment-dispersed type ink is used.

The present invention will be further described below by giving reference examples and working examples. In the following, part(s) or % is by weight.

REFERENCE EXAMPLE 1

(Example for the preparation of a vat dye leuco salt)

The components shown below were stirred for 3 hours at 50° C., and filtered under pressure with use of a membrane filter having a pore size of 1 μm (trade name: Fluoropore Filter; produced by Sumitomo Electric Industries, Ltd.). Thereafter, the resulting filtrate was formed into powder by use of a spray dryer to obtain a leuco salt of vat dye corresponding to C.I. Vat Black 9 used in the ink of the present invention.

| | |
|---|---|
| C.I. Vat Black 9 | 10 parts |
| Hydrosulfite | 10 parts |
| Aqueous sodium hydroxide solution (77° Tw) | 61 parts |
| Hot water | 80 parts |

Herein, the leuco salts of vat dyes used in Examples are those obtained by forming the vat dyes of the corresponding C.I. Number into leuco salts according to the same treatment as in Reference Example 1.

REFERENCE EXAMPLE 2

(Example for the preparation of a leuco salt of a sulfur dye)

The components shown below were mixed, and boiled for 1 hour. Thereafter, hot water of 60° C. was added to the boiled mixture to make it up to 100 parts, which was further boiled for 1 hour. Cooled mixture was filtered under pressure with use of a membrane filter having a pore size of 1 $\mu$m (trade name: Fluoropore Filter; produced by Sumitomo Electric Industries, dtd.), followed by spray drying of the resulting filtrate to obtain Dye II used in the present invention.

| Components for the prepartion of Dye II: | |
|---|---|
| Kayaku Sulfur Yellow GGN (trade name, produced by Nihon Kayaku Co., Ltd.) | 1 part |
| Sodium sulfide (a 20% aqueous solution) | 15 parts |
| Anhydrous sodium carbonate (a 10% aqueous solution) | 6 parts |

Herein, the leuco salts of sulfur dyes used in Examples below are those obtained by forming the sulfur dyes of the corresponding C.I. Number into leuco salts according to the same treatment as in Reference Example 2.

REFERENCE EXAMPLE 3

(Example for the preparation of a solublized vat dye)

Anthrasol Violet ARR (trade name, produced by Hoechst) in an amount of 10 g was dissolved in 490 ml of water. Next, the resulting aqueous solution was treated by an ultrafiltration equipment fitted with a membrane filter produced by Sartorius Co. and having an average pore size of 0.01 $\mu$m, during which an operation of adding 250 ml of pure water was repeated 8 times every time when 250 ml of the filtrate passed through, to obtain a concentrated solution (residual solution) containing the dye and particles larger than the dye. The above equipment was further fitted with a membrane filter produced by the same company and having an average pore size of 0.2 $\mu$m to allow the above concentrated solution to pass through to obtain a filtrate containing only the dye.

The filtrate was formed into powder by use of a spray dryer to obtain C.I. Solubilized Vat Violet 8 used in the present invention.

Herein, the solubilized vat dyes used in Examples are those obtained by removing impurities from the corresponding commercially available dyes according to the same purification process as in Reference Example 3.

REFERENCE EXAMPLE 4

(Example for the preparation of a solubilized sulfur dye)

Hydrosol Black B (trade name, produced by Hoechst) in an amount of 10 g was dissolved in 490 ml of water. Next, the resulting aqueous solution was treated by an ultrafiltration equipment fitted with a membrane filter produced by Sartorius Co. and having an average pore size of 0.01 $\mu$m, during which an operation of adding 250 ml of pure water was repeated 8 times every time when 250 ml of the filtrate passed through to obtain a concentrated solution (residual solution) containing the dye and particles larger than the dye. The above equipment was further fitted with a membrane filter produced by the same company and having an average pore size of 0.2 $\mu$m to allow the above concentrated solution to pass through to obtain a filtrate containing only the dye.

The filtrate was formed into powder by use of a spray dryer to obtain C.I. Solubilized Sulfur Black 1 used in the present invention.

Herein, the solubilized sulfur dyes used in Examples are those obtained by removing impurities from the corresponding commercially available dyes according to the same purification process as in Reference Example 4.

EXAMPLES 1 TO 4

The components shown below were stirred for 5 hours, and further filtered under pressure with use of a membrane filter having a pore size of 0.45 $\mu$m (trade name: Fluoropore Filter; produced by Sumitomo Electric Industries, Ltd.) to obtain Ink 1 to Ink 4 of the present invention.

| | |
|---|---|
| (1): | |
| Na leuco salt of C.I. Vat Black 9 | 4 parts |
| Poyethylene glycol (average molecular weight: 2,000) | 10 parts |
| Sodium erythorbate | 1 part |
| Water | 90 parts |
| Nonionic surface active agent | 0.1 part |
| (trade name: Emulgen PP-150, available, from Kao Corporation) | |
| (2): | |
| Na leuco salt of C.I. Vat Blue-1 | 2.1 parts |
| C.I. Direct Blue 86 | 0.9 part |
| Ethylene glycol | 8 parts |
| Glycerol | 12 parts |
| Hydroquinone | 0.5 part |
| Ethylene glycol monophenyl ether | 1 part |
| Water | 79 parts |
| (3): | |
| Na leuco salt of C.I. Vat Red 10 | 3 parts |
| Diethylene glycol | 20 parts |
| Polyethylene glycol (average molecular weight: 300) | 10 parts |
| N-methyl-2-pyrrolidone | 15 parts |
| Methylhydroquinone | 0.5 part |
| Water | 55 parts |
| (4): | |
| Na leuco salt of C.I. Vat Yellow 2 | 1.2 parts |
| C.I. Direct Yellow 86 | 0.8 part |
| Poyethylene glycol (average molecular weight: 1,000) | 10 parts |
| L-ascorbic acid | 1 part |
| 1,3-Dimethyl-2-imidazolidinone | 16 parts |
| Water | 90 parts |

Next, the above Ink 1 to Ink 4 were put in a storage bottle and stored for 3 month at 40° C. to evaluate the storage stability of the ink.

The above Ink 1 to Ink 4 were also set on an ink-jet printer PJ-1080A (trade name, produced by Canon Inc.)

carrying out the recording by utilizing a piezoelectric device to make prints on copying paper and bond paper in Example 1 was also made to obtain the results shown in Table 1.

TABLE 1

|  | Properties | | Water resistance*4 | | | | |
|---|---|---|---|---|---|---|---|
|  | Viscosity*1 (cP) | Surface tension *2 (dyne/cm) | Storage stability*3 | Copying paper | Bond paper | Color performance*5 | Clogging*6 |
| Example 1 | 3.3 | 42 | A | A | A | A | A |
| Example 2 | 2.1 | 55 | A | A | A | AA | A |
| Example 3 | 4.8 | 54 | A | A | A | A | A |
| Example 4 | 2.9 | 48 | A | A | A | AA | A |
| Comparative Example 1 | 3.3 | 42 | C | A | A | A | C |
| Comparative Example 2 | 4.8 | 54 | A | C | C | AA | A |
| Comparative Example 3 | 6.3 | 49 | C | A | A | A | C | to evaluate the water resistance and color performance.

Also, capping was applied on the print head, which was allowed to stand for 1 month at 40° C. Thereafter, the printing was again carried out and the power of the printer was shut off after printing on 3 lines to examine the state of clogging of 24 nozzles.

Results obtained in the above and the properties of Ink 1 to Ink 4 are shown in Table 1.

COMPARATIVE EXAMPLE 1

Ink was prepared in the same manner as in Example 1 except that among the components for Ink 1 in Example 1, sodium erythorbate (an antioxidant) was not contained, to obtain the ink for comparison in the present invention. Evaluation same as in Example 1 was also made to obtain the results shown in Table 1.

COMPARATIVE EXAMPLE 2

Ink was prepared in the same manner as in Example 3 except that among the components for Ink 1 in Example 1, C.I. Acid Red 35 was used as the dye in place of the Na leuco salt of Vat Red 10, to obtain the ink for comparison in the present invention. Evaluation same as in Example 1 was also made to obtain the results shown in Table 1.

| Comparative Example 3 | |
|---|---|
| Carbon black | 10 parts |
| Ethylene glycol | 15 parts |
| Propylene glycol | 5 parts |
| Sorbitan | 10 parts |
| Shellac | 3 parts |
| Sodium hydroxide | 0.5 part |
| Nonionic surface active agent (trade name: Emulgen 931, available from Kao Corporation) | 0.1 part |
| Water | 70 parts |

Of the above components, shellac was added into an aqueous solution obtained by mixing water and sodium hydroxide, and the mixture was stirred at room temperature to effect dissolution.

Subsequently, Emulgen 931, ethylene glycol and the remaining components were successively added to carry out pre-mixing for 2 hours with use of a stirrer, and the mixture was further milled for 20 hours with use of a ball mill, followed by filtering under pressure with use of a membrane filter having a pore size of 1 μm (trade name: Fluoropore Filter; produced by Sumitomo Electric Industries, Ltd.) to obtain the pigment ink for comparison in the present invention. Evaluation same as in Example 1 was also made to obtain the results shown in Table 1.

*1: Measurement of viscosity
  Visconic ELD produced by Tokyo Keiki Co., Ltd. was used.
*2: Measurement of surface tension
  Kyowa CBV Surface Tensiometer A-1 produced by Kyowa Kagaku Co., Ltd. was used.
*3: Evaluation of storage stability
  80 g of ink was put in a storage bottle (trade name: Schott; produced by Duran) of 100 ml and stored for 3 months at 40° C. Thereafter, the generation of precipitates was visually examined to evaluate the storage stability of the ink.
  A ... No formation of precipitates
  C ... Precipitates formed.
*4: Evaluation of water resistance
  Alphabets of A to Z were printed on commercially available copying paper and bond paper. After being left for 1 day, the prints were dipped in water for 5 minutes to examine the flow-out of ink from prints and the blur on the white ground to evaluate water resistance.
  A ... No flow-out of ink from prints and no blur on the white ground.
  B ... Flow-out of ink from prints was observed in part, and the blur on the white ground was observed also in some extent.
  C ... Flow-out of ink from prints occurred to make it difficult to read the letters of the alphabets, and the blur on the white ground is also observed.
*5: Evaluation of color performance
  A solid print of 3×5 cm$^2$ was made on commercially available bond paper and its color definition was visually evaluated.
  AA ... Very high color definition. (Chromatic color is of high saturation and black color is of high color density.)
  A ... Color is definite.
  B ... Low color definition with dullness.
*6: Evaluation of clogging
  Evaluated based on the number of the clogged nozzle among 24 nozzles.
  A ... 0
  B ... 1 to 3
  C ... 4 or more

EXAMPLES 5 TO 16

Examples 1 to 4 were repeated to prepare ink, except that the dyes used in Examples 1 to 4 were replaced by the dyes shown in Table 2 following, and the same evaluation as above was made to obtain the results as shown in Table 3.

TABLE 2

| Example | Dye used |
| --- | --- |
| 5 | Na leuco salt of C.I. Sulfur Black 11 in place of the dye used in Example 1 |
| 6 | Na leuco salt of C.I. Sulfur Blue 7 in place of the dye used in Example 2 |
| 7 | Na leuco salt of C.I. Sulfur Red 13 in place of the dye used in Example 3 |
| 8 | Na leuco salt of C.I. Sulfur Yellow 16 in place of the dye used in Example 4 |
| 9 | C.I. Solubilized Sulfur Black 1 in place of the dye used in Example 1 |
| 10 | C.I. Solubilized Sulfur Blue 2 in place of the dye used in Example 2 |
| 11 | C.I. Solubilized Sulfur Red 6 in place of the dye used in Example 3 |
| 12 | C.I. Solubilized Sulfur Yellow 19 in place of the dye used in Example 4 |
| 13 | C.I. Solubilized Vat Black 25 in place of the dye used in Example 1 |
| 14 | C.I. Solubilized Vat Blue 6 in place of the dye used in Example 2 |
| 15 | C.I. Solubilized Vat Violet 8 in place of the dye used in Example 3 |
| 16 | C.I. Solubilized Vat Yellow 45 in place of the dye used in Example 4 |

TABLE 3

| | Properties | | | Water resistance[*4] | | | |
| --- | --- | --- | --- | --- | --- | --- | --- |
| Example | Viscosity[*1] (cP) | Surface tension [*2] (dyne/cm) | Storage stability[*3] | Copying paper | Bond paper | Color performance[*5] | Clogging[*6] |
| 5 | 3.3 | 42 | A | A | A | A | A |
| 6 | 2.1 | 55 | A | A | A | AA | A |
| 7 | 4.8 | 54 | A | A | A | A | A |
| 8 | 2.9 | 48 | A | A | A | AA | A |
| 9 | 3.3 | 42 | A | A | A | A | A |
| 10 | 2.1 | 55 | A | A | A | AA | A |
| 11 | 4.8 | 54 | A | A | A | A | A |
| 12 | 2.9 | 48 | A | A | A | AA | A |
| 13 | 3.3 | 42 | A | A | A | A | A |
| 14 | 2.1 | 55 | A | A | A | AA | A |
| 15 | 4.8 | 54 | A | A | A | A | A |
| 16 | 2.9 | 48 | A | A | A | AA | A |

EXAMPLES 17 TO 32

Using the ink used in Example 1 to 16 each, and using as an ink-jet recording apparatus an ink-jet printer utilizing a heating element (BJ-80, trade name, produced by Canon K. K.), printing was performed on commercially available copying paper and bond paper, and the prints were passed through a heat roller of 120° C., to evaluate the water resistance of the resulting prints.

Evaluation of the water resistance was made by immersing the prints in water for 24 hours to examine the flow-out of ink from the prints and the blur of white grounds. As a result, no flow-out of ink from the prints and no blur of white grounds were seen in any prints.

Good water resistance was also seen when the prints were treated by irradiation of light for 10 minutes from an ultraviolet lamp of 366 nm in wavelength (trade name: Topcon Pan UV Lamp, PUV-1, produced by Tokyo Optical Co., Ltd.) in place of the treatment by the heat roller.

According to the ink for ink-jet recording of the present invention and the recording process employing the same, it is possible to obtain records excellent in the fastness of every kind, particularly the water resistance, when used on not only designated paper specially prepared for use in ink-jet recording but also other recording media having a recording face on which fibers are exposed, in particular, generally used ordinary sized paper typified by copying paper, report paper, bond paper and continuous business form. In another embodiment of the present invention, it is also possible to carry out the recording of an excellent color performance in addition to the good water resistance.

Since the ink used in the present invention is excellent in the storage stability, it is further possible to carry out the recording of good practical utility as being free from clogging in the nozzles or the like.

We claim:

1. An ink-jet recording process in which ink is ejected from an orifice in accordance with a recording signal, comprising the step of:
    adhering ink on a recording medium having a recording face on which fibers are exposed, wherein said ink comprises
    (1) at least a water-soluble dye selected from the group consisting of a solubilized vat dye, a solubilized sulfur dye, a leuco salt of a vat dye, and a leuco salt of a sulfur dye, and
    (2) an antioxidant, wherein said antioxidant is contained in an amount ranging between 0.1 to 10% by weight based on the total weight of the ink.

2. The ink-jet process of claim 1, wherein said adhering step is performed on a recording medium that has a basis weight ranging between 30 to 200 g/m$^2$.

3. The ink-jet recording process of claim 1, wherein said adhering step uses an ink that contains a water-soluble anionic dye.

4. The ink-jet recording process of claim 1, wherein said adhering step uses an ink that contains a water soluble dye in an amount ranging between 0.1 to 15% by weight based on the total weight of the ink.

5. The ink-jet recording process of claim 1, wherein said adhering step uses an ink that has a surface tension of 35 to 65 dyne/cm and a viscosity of 15 cP or less at 25° C.

6. An ink-jet recording process in which ink is ejected from an orifice in accordance with a recording signal, comprising the steps of:
    a. applying to a recording medium an aqueous ink containing
        (1) a water-soluble dye selected from the group consisting of a solubilized vat dye, a solubilized sulfur dye, a leuco salt of a vat dye, and a leuco salt of a sulfur dye, and (2) an antioxidant, wherein said antioxidant is contained in an amount ranging between 0.1 to 10% by weight based on the total weight of the ink; and b. fixing by oxidation.

7. The ink-jet recording process of claim 6, wherein said applying step uses a recording medium that has a basis weight ranging between 30 to 200 g/m².

8. The ink-jet recording process of claim 6, wherein said applying step uses as a recording medium rosin-sized paper.

9. The ink-jet recording process of claim 6, wherein a heating means is used as a means for said oxidation.

10. The ink-jet recording process of claim 6, wherein a light-irradiating means is used as a means for said oxidation.

11. The ink-jet recording process of claim 6, wherein said applying step uses an ink that contains a water-soluble anionic dye.

* * * * *

UNITED STATES PATENT AND TRADEMARK OFFICE
CERTIFICATE OF CORRECTION

PATENT NO. : 5,257,036
DATED : October 26, 1993
INVENTOR(S) : Koike et al.

It is certified that error appears in the above-identified patent and that said Letters Patent is hereby corrected as shown below:

On the title page, item:
[63] <u>Related U.S. Application Data</u>:

"Continuation of Ser. No. 506,525, Apr. 9, 1990," should read --Division of Ser. No. 506,525, Apr. 9, 1990,--.

<u>COLUMN 1</u>:

Line 5, "continuation" should read --division--;
Line 57, "kind" should read --kinds--; and
Line 66, "method," should read --methods,--.

<u>COLUMN 2</u>:

Line 18, "recording" should read --recording process--.

<u>COLUMN 3</u>:

Line 27, "dyes," should read --dye,--.

<u>COLUMN 4</u>:

Line 7, "dyes," should read --dye,--; and
Line 59, "its" should read --their--.

UNITED STATES PATENT AND TRADEMARK OFFICE
CERTIFICATE OF CORRECTION

PATENT NO. : 5,257,036       Page 2 of 2
DATED : October 26, 1993
INVENTOR(S) : Koike et al.

It is certified that error appears in the above-identified patent and that said Letters Patent is hereby corrected as shown below:

<u>COLUMN 6</u>:

Line 28, "stockgit" should read --Stockigt--.

<u>COLUMN 7</u>:

Line 27, "dtd.)," should read --Ltd.),--.

<u>COLUMN 8</u>:

Line 65, "month" should read --months--.

<u>COLUMN 10</u>:

Line 48, "is" should read --was--.

Signed and Sealed this

Seventh Day of June, 1994

*Attest:*

BRUCE LEHMAN

*Attesting Officer*     *Commissioner of Patents and Trademarks*